(12) United States Patent
Hofer

(10) Patent No.: US 8,837,275 B2
(45) Date of Patent: Sep. 16, 2014

(54) SYSTEM, METHOD AND PROGRAM FOR RE-ROUTING INTERNET PACKETS

(75) Inventor: Scott B. Hofer, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 1235 days.

(21) Appl. No.: 11/350,567

(22) Filed: Feb. 9, 2006

(65) Prior Publication Data
US 2007/0183404 A1 Aug. 9, 2007

(51) Int. Cl.
| | |
|---|---|
| H04L 12/26 | (2006.01) |
| G06F 11/00 | (2006.01) |
| G06F 15/16 | (2006.01) |
| G06F 15/177 | (2006.01) |
| H04L 12/707 | (2013.01) |
| H04L 12/715 | (2013.01) |
| H04L 12/703 | (2013.01) |
| H04L 29/08 | (2006.01) |

(52) U.S. Cl.
CPC .............. *H04L 45/22* (2013.01); *H04L 67/1002* (2013.01); *H04L 45/04* (2013.01); *H04L 45/28* (2013.01); *H04L 67/1034* (2013.01)
USPC . 370/218; 370/237; 370/395.32; 370/395.52; 370/400; 709/203; 709/221; 709/235; 709/239

(58) Field of Classification Search
CPC ..... H04L 45/22; H04L 45/28; H04Q 11/0478
USPC ............... 370/216–228, 237, 395.32, 395.52, 370/400; 709/203, 221, 235, 239
See application file for complete search history.

(56) References Cited

U.S. PATENT DOCUMENTS 6,301,223 B1 * 10/2001 Hrastar et al. ................ 370/227
6,304,980 B1   10/2001 Beardsley et al. ................ 714/6

(Continued)

FOREIGN PATENT DOCUMENTS

| EP | 1519533 A1 | 3/2005 |
| JP | 2001268101 A | 9/2001 |
| TW | 200501673 | 1/2005 |

OTHER PUBLICATIONS

IBM Router Redirect System, Mar. 1, 2001.

(Continued)

*Primary Examiner* — Alpus H Hsu
(74) *Attorney, Agent, or Firm* — Schmeiser, Olsen & Watts, LLP; Arthur Samodovitz

(57) ABSTRACT

A first site comprises a first ISP, a first server and a first router interposed between the first ISP and the first server. A second site comprises a second ISP, a second server and a second router interposed between the second ISP and the second server. While the second server is operating, both the first and second routers broadcast announcements of an IP address of the second server. The announcements of the IP address broadcast by the first router indicate the first router as a less preferred route to the IP address than the announcements of the IP address by the second router indicating the second router as a route to the IP address. Consequently, packets addressed to the IP address are routed to the second server via the second ISP and the second router. Subsequently, the second site fails, and concurrently, the second router ceases to broadcast announcements of the IP address of the second site and the first router continues to broadcast announcements of the IP address of the second site. Consequently, subsequent packets addressed to the IP address are routed to the first server via the first ISP and the first router, bypassing the second ISP. A semiautomatic technique is also disclosed.

14 Claims, 4 Drawing Sheets

(56) References Cited

U.S. PATENT DOCUMENTS

| | | | |
|---|---|---|---|
| 6,519,224 B2* | 2/2003 | Hrastar et al. | 370/227 |
| 6,530,032 B1 | 3/2003 | Shew et al. | 714/4 |
| 6,779,039 B1 | 8/2004 | Bommareddy et al. | |
| 6,965,937 B2* | 11/2005 | Gaddis et al. | 709/227 |
| 6,981,055 B1 | 12/2005 | Ahuja et al. | |
| 6,985,963 B1* | 1/2006 | Johnson et al. | 709/242 |
| 7,120,934 B2* | 10/2006 | Ishikawa | 726/23 |
| 7,529,254 B2* | 5/2009 | Tsuge et al. | 370/401 |
| 7,752,324 B2* | 7/2010 | Hamadeh et al. | 709/230 |
| 7,873,993 B2* | 1/2011 | King | 726/11 |
| 8,463,920 B2* | 6/2013 | Johnson et al. | 709/229 |
| 2002/0044553 A1 | 4/2002 | Chakravorty | 370/392 |
| 2004/0109458 A1* | 6/2004 | Lakshmi Narayanan et al. | 370/401 |
| 2004/0268175 A1 | 12/2004 | Koch et al. | |
| 2005/0089015 A1* | 4/2005 | Tsuge et al. | 370/351 |
| 2005/0201302 A1* | 9/2005 | Gaddis et al. | 370/254 |
| 2005/0273645 A1* | 12/2005 | Satran et al. | 714/4 |
| 2005/0283527 A1* | 12/2005 | Corrado et al. | 709/224 |
| 2006/0195607 A1* | 8/2006 | Naseh et al. | 709/238 |
| 2006/0256767 A1 | 11/2006 | Suzuki et al. | |

OTHER PUBLICATIONS

Akira Kato, "Operation of Root DNS", Information Processing, Information Processing Society of Japan, vol. 40, No. 9, pp. 924-928, Sep. 15, 1999 (T5-Partial Translation of the office action where the reference is mentioned).

* cited by examiner

SYSTEM, METHOD AND PROGRAM FOR RE-ROUTING INTERNET PACKETS

FIELD OF THE INVENTION

The present invention relates generally to networks and computer systems, and more specifically to re-routing of network packets to an alternate (or recovery) site.

BACKGROUND OF THE INVENTION

Many types of computer networks are known today, such as Local Area Networks ("LANs"), Wide Area Networks ("WANs"), intranets, and the Internet. For example, clients make requests via the Internet to servers which reside on LANs which are connected to the Internet. It is common for one or more Internet Service Providers ("ISPs") to be logically interposed between the Internet and the LAN of a server, and for one or more edge routers to be physically and/or logically interposed between this LAN of the server and the ISP(s). Having more than one connection to the Internet is called "multihoming". The use of two or more ISPs allows for load balancing and increased resiliency. The edge routers for the server periodically broadcast Border Gateway Protocol ("BGP") announcements of the server network's Autonomous System Number ("ASN") and associated routes leading to the server. BGP is defined in RFC 1771, and is an exterior gateway routing protocol used to share information between routers, or groups of routers, to determine efficient paths. The adjacent ISPs and routers receive these broadcasts. During normal operation, each ISP receives packets that include a source Internet Protocol ("IP") address and a destination IP address, and then forwards or "routes" the packets to the destination IP address via the intervening router(s) to the server. (A packet is a piece of a message transmitted over a packet-switching network. One of the key features of a packet is that it contains the destination address in addition to the data. In IP networks, packets are often called datagrams.) The destination IP address may lead to a single server which can handle the request, a load balancer or proxy server for a pool of servers to handle the request or a gateway for the network on which the server or server pool resides. The servers at the destination IP address are sometimes called a "site" or "production site". If the site furnishes web pages to the requester as an interface to the requested application, the destination server can also be called a "website".

Often, there is a backup production site ("backup site") on a backup network in case the original production site ("original site") fails. There may be one or more ISPs for the backup site as well. When the original site fails, the edge routers of the original site stop their periodic BGP (Border Gateway Protocol) announcements of the original site Autonomous System Number ("ASN") and associated routes. The ISPs of the original site notice the cessation of the ASN and its associated routes for the original site, and in response, update their routing table to remove any routes associated with this ASN. The ISPs of the original site propagate these changes throughout the Internet via BGP. At this time the original site's routes and IP addresses are unknown to the Internet. To re-route packets to the backup site, it was known to use Domain Name System ("DNS") updates. (DNS is a system used to translate host and domain names to IP addresses.) These DNS updates change the IP address-hostname and IP address-domain name translations. Because this solution relies on hostnames and domain names, it does not support applications or implementations that require the original IP addresses to be maintained at the backup site. Additionally, DNS updates may take up to seventy two hours to propagate worldwide (depending on individual DNS Time To Live timout settings). Extra work is required to change IP addresses at the backup site and configure DNS properly (e.g. zone file modification). This extra work may translate to longer periods of outages. Another known solution is to install the same ISP at both sites. However, this may be costly depending on the ISP and the site(s). If the need arises to recover at an unplanned location it is likely that the same ISP may not be installed or available at this location in a timely fashion.

Accordingly, an object of the present invention is to expedite and facilitate re-routing of network packets to a backup site when an original site fails.

SUMMARY OF THE INVENTION

The present invention resides in a system, method and program for redirecting to a first site, packets addressed to a second site after failure of the second site. The first site comprises a first ISP, a first server and a first router interposed between the first ISP and the first server. The second site comprises a second ISP, a second server and a second router interposed between the second ISP and the second server. While the second server is operating, both the first and second routers broadcast announcements of an IP address of the second server. The announcements of the IP address broadcast by the first router indicate the first router as a less preferred route to the IP address than the announcements of the IP address by the second router indicating the second router as a route to the IP address. Consequently, packets addressed to the IP address are routed to the second server via the second ISP and the second router. Subsequently, the second site fails, and concurrently, the second router ceases to broadcast announcements of the IP address of the second site and the first router continues to broadcast announcements of the IP address of the second site. Consequently, subsequent packets addressed to the IP address are routed to the first server via the first ISP and the first router, bypassing the second ISP.

According to features of the present invention, the first router is an edge router for a first network containing the first server, and the second router is an edge router for a second network containing the second server. The announcements of the IP address broadcast by the first router indicate a less preferred route to the first router than to the second router to reach the IP address. For example, the announcements of the IP address broadcast by the first router may include AS_PATH prepends to indicate a longer path to the first router than to the second router to reach the IP address.

The present invention also resides in another system, method and program for redirecting to a first site, packets addressed to a second site after failure of the second site. The first site comprises a first ISP, a first server and a first router interposed between the first ISP and the first server. The second site comprises a second ISP, a second server and a second router interposed between the second ISP and the second server. Before failure of the second site, BGP filters in the first ISP and the first router are configured to accept an IP address of the second site. While the second server is operating, the second router broadcasts announcements of the IP address of the second server, such that packets addressed to the IP address are routed to the second server via the second ISP and the second router, bypassing the first ISP. Subsequently, the second site fails, and the second router ceases to broadcast announcements of the IP address of the second site and the first router begins to broadcast announcements of the IP address of the second site, such that subsequent packets addressed to the IP address are routed to the first server via the first ISP and the first router, bypassing the second ISP.

DETAILED DESCRIPTION OF THE PREFERRED EMBODIMENTS

Figure 1:
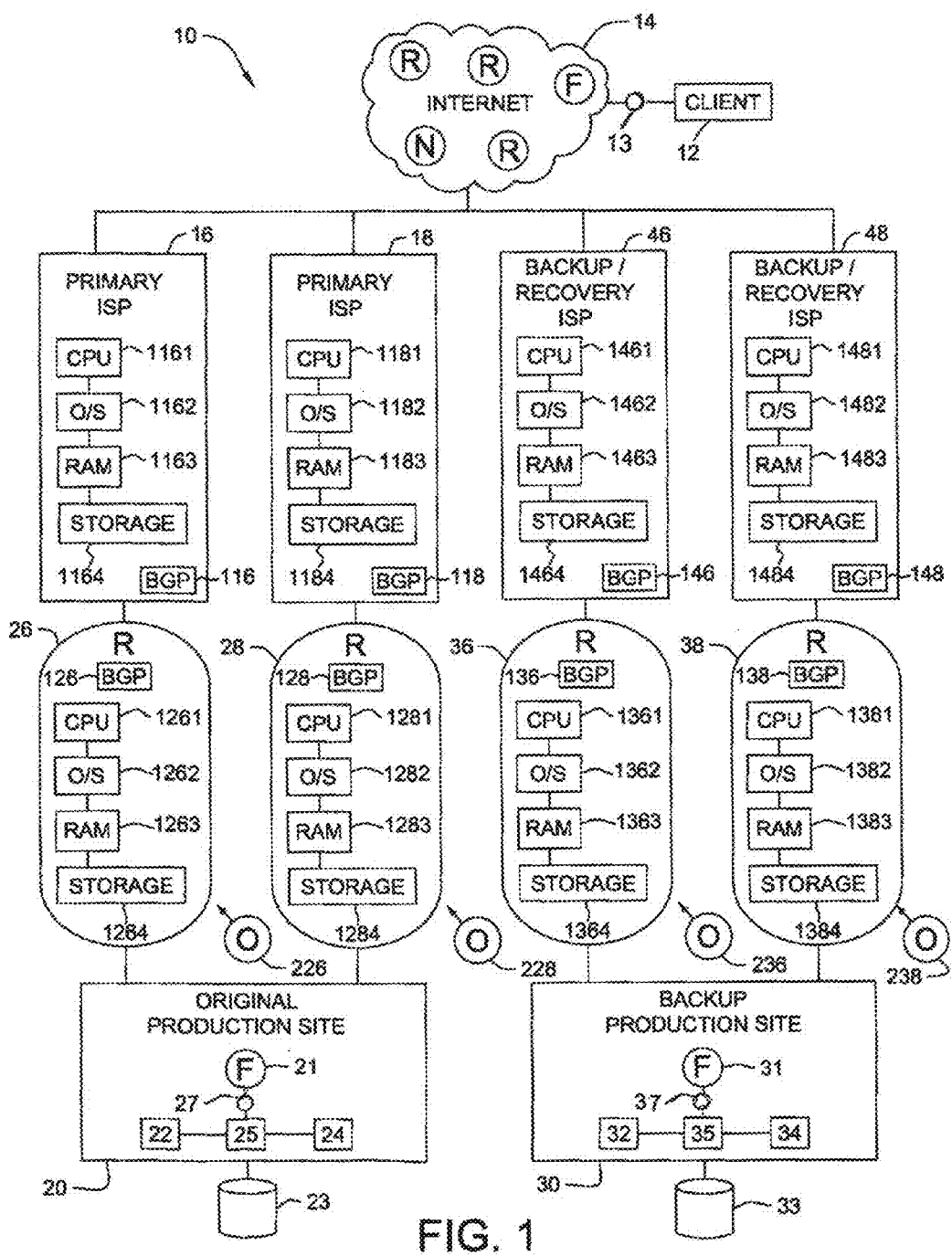
FIG. 1 is a block diagram of a distributed computer system, including an original production site, a backup production site and edge routers associated with the original site and backup site, which embodies the present invention.

The present invention will now be described in detail with reference to the figures. FIG. 1 illustrates a distributed computer system generally designated 10. Distributed computer system 10 comprises a client 12 connected to the Internet 14 via a WAN or other network 13. The Internet comprises a multitude of network devices including firewalls "F", routers "R", gateways "G", and switching nodes "N", as known in the prior art. System 10 also includes two (or more) Internet Service Providers ("ISPs") 16 and 18 interposed between the Internet 14 and an original production site ("original site") 20. ISP 16 includes a CPU 1161, operating system 1162, RAM 1163 and storage 1164 for BGP program function 116. ISP 18 includes a CPU 1181, operating system 1182, RAM 1183 and storage 1184 for BGP program function 118. BGP program functions 116 and 118 include respective address range filters. System 10 also includes two (or more) Internet Service Providers ("ISPs") 46 and 48 interposed between the Internet 14 and a backup production site ("backup site") 30. As known in the prior art, each ISP includes a known BGP filter (or equivalent) which controls which ranges of IP addresses announced from the original site 20 or from the backup site 30 are recognized/processed by the ISP. Thus, for each packet that reaches an ISP from its servers and from the Internet, the ISP will only process and pass the packet if its source IP address is within the range recognized and processed by the BGP filter (or equivalent) of the ISP. By way of example, the original site 20 comprises a firewall 21, a LAN network 27, one or more servers 22 and 24, load balancer 25, storage 23, and other computer-related devices on network 27. The firewall 21 and load balancer 25 are optional. The use of two or more ISPs provides "multihoming", allowing for load balancing and increased resiliency, although if desired, only one ISP can be used. Likewise, the use of two or more servers at each site is optional, and only one server is needed at each site. Edge router 26 is physically and/or logically interposed between ISP 16 and firewall 21. Edge router 28 is physically and/or logically interposed between ISP 18 and firewall 21. Each ISP 16 and 18 receives packets with the destination IP address leading to a requested server 22 or 24, and then forwards or "routes" each packet to the destination IP address via the respective edge router. In the illustrated example, the destination IP address leads to load balancer 25 via firewall 21. (Alternately, the destination address is the server 22 or 24.) The load balancer 25 then forwards the request to one of the servers 22 or 24 based on a known load balancing algorithm. (The load balancer, firewall, and associated algorithm are not required for the present invention.) Also in the illustrated example, the request results in server 22 or 24 furnishing a web page, file or other data to the requesting client 12. ISPs 16 and 18 and edge routers 26 and 28 include respective, known BGP protocol program functions 126 and 128 (including respective address range filters or equivalent) which control which ranges of source IP addresses from the original site 20 are recognized/processed by the respective ISPs and edge routers. Thus, for each packet that reaches the ISPs 16 and 18 and edge routers 26 and 28, the respective BGP protocol program function 126 and 128 will only recognize and process the packet if its source IP address is within the range accepted by the BGP filter (or equivalent). Router 26 includes a CPU 1261, operating system 1262, RAM 1263 and storage 1264 for BGP program function 126. Router 28 includes a CPU 1281, operating system 1282, RAM 1283 and storage 1284 for BGP program function 128.

The owner of the original site 20 has also provided a backup site 30 on a backup network 36 in case the original site 20 fails. There are two or more ISPs 46 and 48 for the backup site 30. ISP 46 includes a CPU 1461, operating system 1462, RAM 1463 and storage 1464 for BGP program function 146. ISP 48 includes a CPU 1481, operating system 1482, RAM 1483 and storage 1484 for BGP program function 148. In the illustrated example, the backup site 30 includes a firewall 31, LAN network 37, a load balancer 35, two or more servers 32 and 34, storage 33 and other computer-related devices on the network 36. Backup site 30 also includes edge router 36 interposed between ISP 46 and firewall 31, and edge router 38 interposed between ISP 48 and firewall 31. ISPs 46 and 48 include respective, known BGP protocol program functions 146 and 148 (including respective address range filters) which control which ranges of source IP addresses are recognized/processed by the respective ISPs. Similarly, edge routers 36 and 38 include respective, known BGP protocol program functions 136 and 138. Thus, for each packet that reaches the ISPs 46 and 48 and edge routers 36 and 38 from its servers and from the Internet, the respective BGP protocol program function 136 and 138 will only recognize, process and pass the packet if its source IP address is within the range accepted by the BGP filter (or equivalent). Router 36 includes a CPU 1361, operating system 1362, RAM 1363 and storage 1364 for BGP program function 136. Router 38 includes a CPU 1381, operating system 1382, RAM 1383 and storage 1384 for BGP program function 138.

Based on a current inter-ISP BGP filtering standard, the IP addresses to be rerouted have a size /24 (256 contiguous IP address block) or larger in order to be received by ISP 46 and 48, announced to the rest of the Internet 14 by ISP 46 and 48, and accepted by the rest of the Internet 14 including ISP 16 and 18. However, as the inter-ISP BGP filtering standard changes, this size limitation may change, and the present invention is applicable to future network address size limitations resulting from future inter-ISP BGP filtering standards, and new version(s) of IP (e.g. IPv6) or BGP or other events.

The following is a semiautomatic process for re-routing packets, originally intended for the original site 20, to the backup site 30, in accordance with one embodiment of the present invention. When original site 20 fails, the BGP protocol program functions 116 and 118 within the edge routers 26 and 28 of the ISPs 16 and 18 learn of the failure by no longer receiving the announcements for the routes from edge routers 26 and 28 (BGP protocol functions 126 and 128). Also, when the original site 20 fails, a support person learns of the problem from users (i.e. complaints via a help desk or problem tickets) and notifies an administrator. In response, the BGP protocol functions 116, 118, 126, and 128 stop their periodic announcements of the Autonomous System Number ("ASN") path and associated routes that represent site 20. In the illustrated example, this is the ASN path and associated routes of the original site 20 which includes servers 22 and 24, firewall 21, load balancer 25 and storage 23. The ISPs 16 and 18 notice the cessation of the announcements of the ASN path and associated routes for the original site 20, and in response, update their routing tables to remove any associated route entries. Also, ISPs 16 and 18 notify their BGP neighbors that these routes associated with this ASN no longer exist. This information propagates through the Internet 14, world-wide including to ISPs 46 and 48 and edge routers 36 and 38, typically in less than five minutes. This is called Internet routing table convergence.

In response to previous requests from the backup site 30 (and as preparation for a possible outage), network engineers at ISP 46 and 48 updated their BGP filters (or equivalent) to accept the announcement of IP address of the original site 20 instead from the backup site 30. In response to the failure of the original site 20, the administrator at the backup site 30 configures the BGP protocol functions 136 and 138 in the edge routers 36 and 38 in the backup site 30 to broadcast announcements of the IP addresses and routes of the original site 20, using backup site 30's ASN, to the backup ISPs 46 and 48 that are directly connected and BGP peering to the backup site 30. (BGP peering comprises exchange of BGP protocol information between two routers (peers) configured as BGP neighbors.) This tells the ISPs 46 and 48 that the backup site has a path to the IP addresses of the original site 20. ISPs 46 and 48 forward on these announcements to the rest of the Internet via BGP protocol process 146 and 148. The Internet routing table converges quickly, typically less than five minutes. Consequently, any ISPs or routers (in the Internet as well as ISPs 16, 18, 46, 48, and edge routers 26, 28, 36 and 38) that receive subsequent packets on the Internet addressed to the IP address(es) of the original site 20 will route these packets instead to the backup site 30. The new routing information indicates that packets addressed to the original site 20 should be routed directly to the ISPs 46 and 48 of the backup site 30 (without first being routed to the ISPs 16 and 18 of the original site 20). Once the routing tables have converged, all Internet traffic intended for the original site 20 will be routed to the backup site 30 via ISPs 46 and 48 and edge routers 36 and 38 (without passing through ISPs 16 or 18).

The following steps implement the foregoing re-routing process:

Preliminary Steps, i.e. before failure of original site 20:

a) All BGP filters and other security features (i.e. access control lists, route-maps, community strings, other) at edge routers 36 and 38 (and any other edge routers connected to the backup site) of ISP 46 and 48 of the backup site 30, are opened/expanded to admit address ranges associated with the original site 20. The edge routers 36 and 38 do not announce the IP address of the original site 20 to the ISPs 46 and 48 until there is an outage at the original site 20. So, during normal operation, the other ISPs and routers do not route packets with the IP address of the original site 20 to ISPs 46 or 48. Instead, the other ISPs and routers route packets with the IP address of the original site 20 to ISPs 16 or 18 en route to the original site 20. If there are any problems with implementing the readiness of the ISPs 46 and 48, edge routers 36 and 38 and backup site 30 (according to step a) above) to backup original site 20, an administrator will check BGP protocol functions 146, 148, 136 and 138 which will show the problem.

Later Steps during Backup Operation, i.e. after failure of original site 20:

b) After failure of the original site 20, an administrator notifies BGP protocol functions 126 and 128 of the original site 20 to stop announcing the IP address of the original site (assuming the edge routers 26 and 28 are still operational; if they are not operational there may be no need to modify BGP protocol functions 127 and 128). Thus, for each address range of the original site 20, the BGP protocol functions 136 and 138 in the edge routers of the backup site 30 (automatically or semi-automatically) configure a predetermined BGP "announcement" that the destination IP address for the original site 20 now corresponds to the ASN and routes for the backup site 30.

c) Using this announcement, the backup site 30's edge routers 36 and 38 announce to the ISPs 46, and 48 at backup site 30, changes to source addresses that should be routed through the BGP filters of the ISPs 46 and 48 (and any other ISPs that are directly connected and BGP peering to the backup site 30). Using this announcement, the backup site 30's edge routers also announce to the ISPs 46, and 48 (and any other ISPs that are directly connected and BGP peering to backup site 30) that the backup site 30 will receive the packets addressed to the original site 20. (ISPs typically filter routing announcements that they will accept or to which they will listen at the /24 (256 contiguous IP addresses) range level. Also, this minimizes the size of Internet routing tables.) In the illustrated example, the address range being recovered is a full /24 (256 contiguous IP addresses) or larger range to be accepted or listened to by BGP filters (or equivalent) within the BGP protocol functions 116, 118, 126, 128, 146, 148, 136 and 138 as well as any other Internet routers worldwide accepting /24 or larger announcements. As an example, a /23 network has a larger range or block of IP addresses than a /24 network.

f) After production site 20 is recovered/restored, the BGP announcements of step b) and c) from the edge routers 36 and 38 of the backup site 30 are terminated, and the administrator configures original site 20 BGP protocol process 126 and 128 to once again announce the original IP addresses of original site 20 and their associated routes via its ASN to the ISPs 16 and 18 of the original site 20. ISPs 16 and 18 then announce to the rest of the world that they should receive and process packets addressed to the servers 22 and 24, i.e. so that ISPs 16 and 18 will receive and pass through packets addressed to the original site 20 and ISPs 46 and 48 will not.

The following is an automatic process for re-routing packets in accordance with another embodiment of the present invention. When original site 20 fails, the BGP protocol functions 126 and 128 within edge routers 26 and 28 stop their periodic announcements of the Autonomous System Number ("ASN") path and routes of original site 20. The ISPs 16 and 18 notice the cessation of the ASN path and corresponding routes for the original site 20, and in response, update their routing table to remove the routes associated with this ASN path and notify their BGP neighbors who in turn notify their BGP neighbors until the Internet routing table reconverges that these specific routes to this ASN no longer exist. BGP protocol functions 136 and 138 for the backup site 30 have also been broadcasting BGP announcements for these same routes but these broadcasts are indicated as less preferred than the broadcasts from the original site routes. When the broadcasts of the more preferred routes from original site 20 stop, the broadcasts of the routes from backup site 30 will take precedence. Once the Internet routing table reconverges with these less preferred routes, any ISPs or routers that receive subsequent packets on the Internet addressed to the IP address of the original site 20 will route these packets to the backup site 30. The new routing information indicates that packets addressed to the original site 20 should be routed directly to the ISPs 46 and 48 of the backup site 30, without first being routed to the ISPs 16 and 18 of the original site 20. Once the routing tables have converged, all Internet traffic intended for the original site 20 will be routed directly to the backup site 30 (without passing through ISPs 16 or 18).

In this embodiment of the present invention, upon failure of original site 20 and cessation of the announcements from BGP protocol functions 126 and 128, the announcements by BGP protocol functions 136 and 138 automatically take preference. This is implemented by making the routes announced by the backup site 30 ASN routers 36 and 38 less preferred than the routes announced by the original site ASN routers 26 and 28. Therefore, when the original site 20 is operating normally it will receive all traffic destined for the original site 20 IP addresses. However, during a failure of the original site 20 and its ability to announce its routes to the Internet 14, the routes broadcast from backup site 30 become preferred and propagate through the worldwide Internet 14. By way of example, the BGP protocol functions 136 and 138 can use AS_PATH prepends to make their announcements less preferred than the announcements from the original site 20 BGP protocol functions 126 and 128. The AS path length is the fifth item in the BGPv4 route selection decision process. By appending the backup site 30 ASN multiple times onto the AS_PATH this lengthens the AS_PATH to reach the backup site 30. This way the original site 20 has no AS_PATH prepends (in an effort to have the shortest, and most preferred AS_PATH possible) while the backup site 30 has multiple AS_PATH prepends lengthening its AS path thus making it less desirable, or less preferred, by BGP. Therefore, under normal operating modes, BGP will select the original site 20 with the shortest AS path length until such time as the original site 20 fails and the backup site 30 with the longer AS path length becomes the more desirable, or preferred, route. Six AS_PATH prepends are currently recommended to make this effective.

Figure 2A:
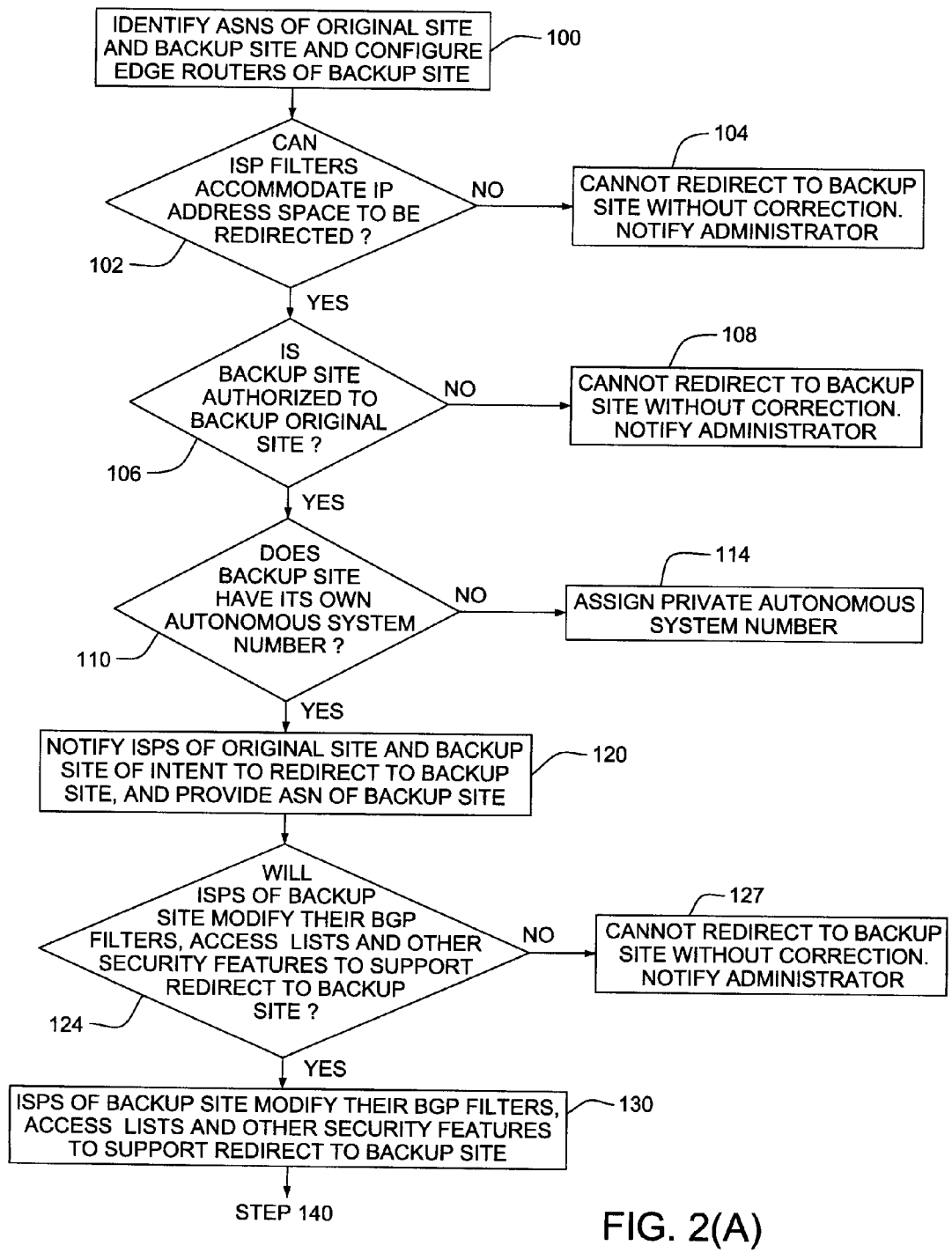
FIGS. 2(A), 2(B) and 2(C) form a flow chart of BGP protocol program functions within the edge routers associated with the backup production site, and other related process steps.
Figure 2B:
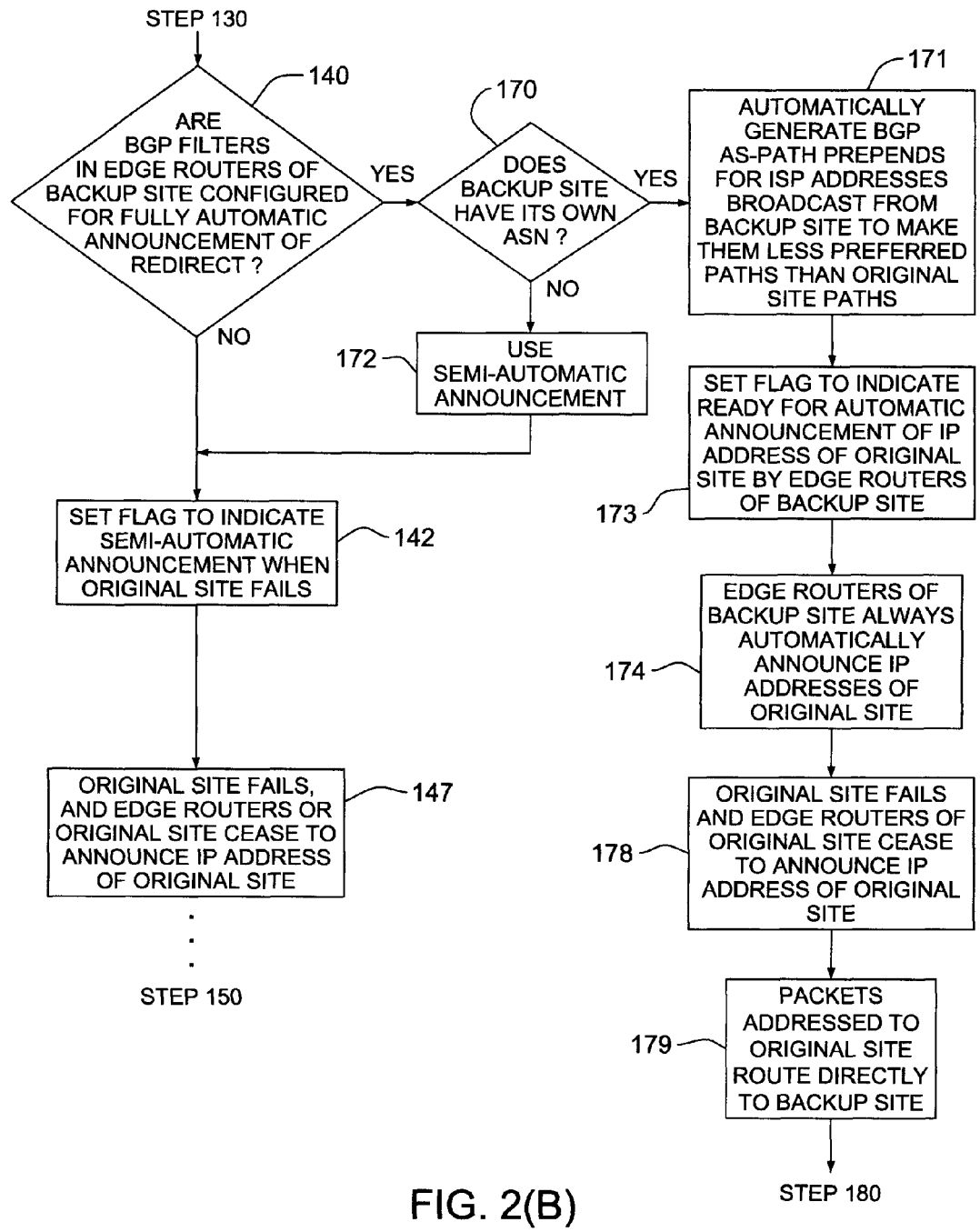
Figure 2C:
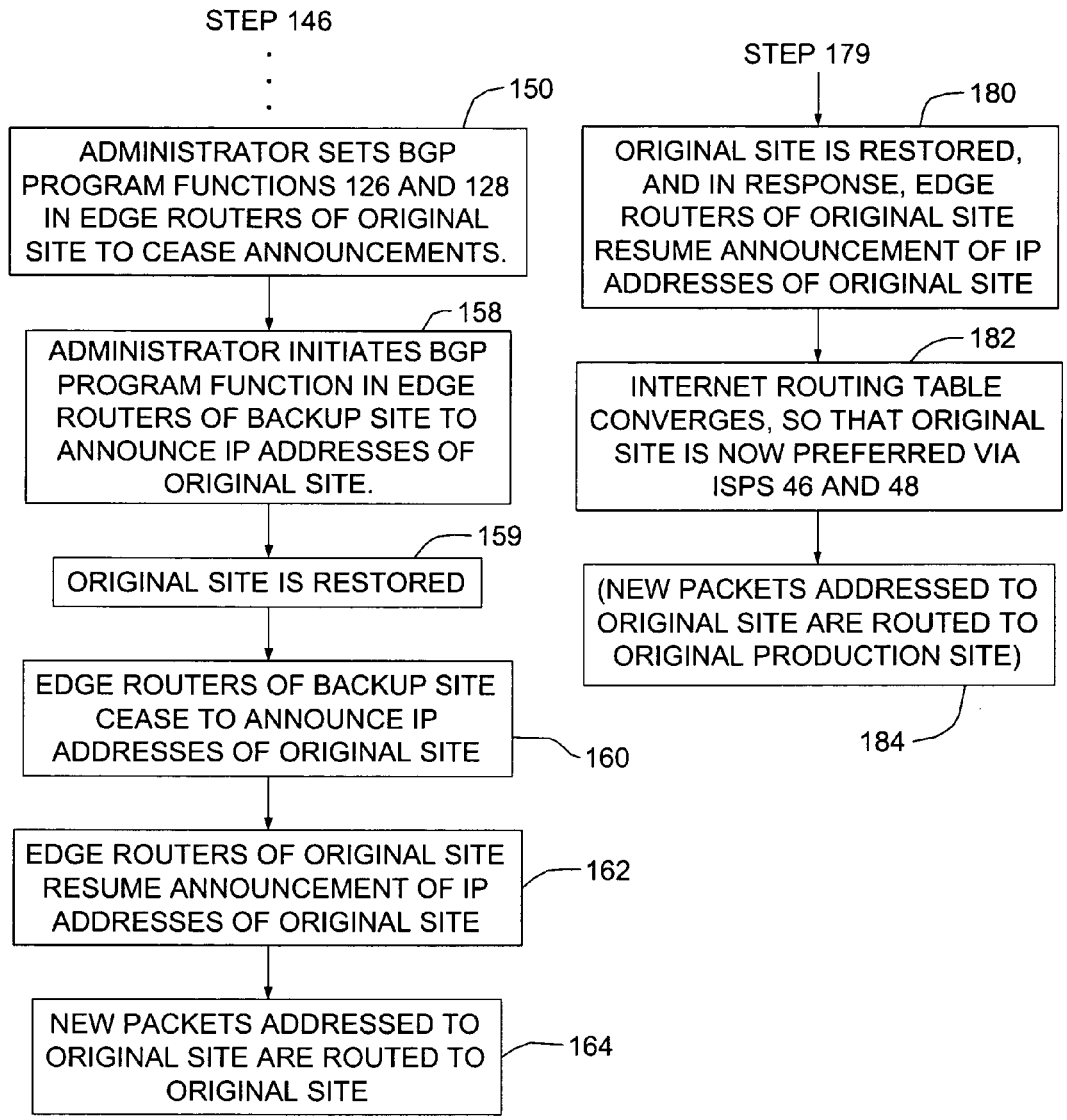

FIGS. 2(A), 2(B) and 2(C) illustrate the foregoing automatic and semiautomatic processes in more detail. Preferably, the following steps 100-140 and 170-174 are performed as setup prior to failure of original site 20. This will (identify any problems in the setup and) prepare backup site 30 to perform its backup role in the event of subsequent failure of original site 20. In step 100, an administrator identifies the IP address of the original site and the ASN of the original site and the ASN of the backup site 30, and configures each of the BGP protocol functions 136 and 138. Next, the administrator determines if the IP address space of the original site 20 is longer than the BGP filters in ISPs 46 and 48, in current day practice (/24, or 256 contiguous IP addresses or larger, under today's practice) and can therefore be rerouted through the Internet (decision 102). Each of the ISPs 46 and 48 includes a BGP filter, or equivalent, which determines which announcements and packets can pass through the ISPs to the Internet 14. If the IP address range of the original site 20 is not a large enough block of IP addresses (currently /24 or larger) (decision 102, no branch), then the IP addresses and packets addressed to the original site 20 cannot be redirected to the backup site 30 via this methodology, and no further action can be taken by each of the BGP protocol functions 136 and 138, except to notify an administrator of the problem (step 104). Referring again to decision 102, yes branch, if the IP address space to be redirected meets the BGP filter (or equivalent) requirements, then the administrator and ISP 16, 18, 46, and 48 determine if the backup site 30 is authorized to receive packets addressed to the original site 20 (decision 106). This determination is based on administrator and ISP (16, 18, 46, and 48) authorizations and enforced via ISP and administrator filters in the BGP protocol functions 116, 118, 146, 148, 126, 128, 136, and 138. Typically, an administrator sets these configuration files in edge routers 26, 28, 36 and 38. If backup site 30 is not authorized to backup original site 20 (decision 106, no branch), then the packets addressed to the original site 20 cannot be redirected to the backup site 30, and no further action is taken by each of the BGP protocol functions 136 and 138, except to notify an administrator of the problem (step 108). Alternately, the administrator may change the authorization to authorize backup site 30 to backup original site 20. If backup site 30 is authorized to backup original site 20, then the administrator determines if the backup site 30 has its own Autonomous System Number ("ASN") (decision 110). If not (decision 110, no branch), for one ISP (e.g. ISP 46) connection only the ISP 46 assigns a private ASN to the backup site 30 (step 114) and the administrator configures BGP protocol functions 136 and 138 with the ASN. For a multihomed environment, the administrator may obtain an ASN from the American Registry for Internet Numbers (www.arin.net) and continue from decision 110, yes branch. Next, each of the BGP protocol functions 136 and 138 notifies ISPs 16 and 18 and ISPs 46 and 48 of their intent to redirect packets addressed to original site 20 instead to backup site 30, and the ASN for backup site 30, as follows (step 120). (Each edge router and ISP broadcasts its IP address and the ASN of the network containing the IP address. The ASNs uniquely identify respective networks (containing one or more IP address), and are used to facilitate routing of the packet from the Internet to the destination IP address.) The edge routers 36 and 38 broadcast/announce the IP address of the original site 20, but their broadcast/announcement will be in a secondary or "less preferred" manner, such that the recipient Internet routers of the broadcast/announcement will still route packets addressed to the IP address of the original site to ISPs 16 and 18, and ISPs 16 and 18 will still route these packets to the original site 20 as long as edge routers 26 and 28 continue to broadcast/announce their routes to the IP address of the original site 20. This is because the broadcast/announcement of the IP address of the original site 20 by edge routers 26 and 28 will be in a primary or "more preferred" manner as long as the original site 20 is active and edge routers 26 and 28 continue to announce the IP address of the original site. Next, the administrator of the BGP protocol functions 136 and 138 receives a notification from ISPs 46 and 48 whether ISPs 46 and 48 will update their BGP filters, access lists and other security features (i.e. access control lists, other) to redirect packets addressed to original site 20 instead to backup site 30 (decision 124). ISPs 46 and 48 make this decision based on technical feasibility and internal customer support decisions. (It has already been determined in decisions 102 and 106 that the address space can be technically redirected and that backup site 30 is authorized to backup original site 20.) If ISPs 46 and 48 will not redirect packets addressed to original site 20 instead to backup site 30 (decision 124, no branch), then BGP protocol functions 136 and 138 cannot redirect these packets and notify an administrator accordingly (step 126). However, If ISPs 46 and 48 will redirect packets addressed to original site 20 instead to backup site 30 (decision 124, yes branch), then the administrator requests that ISPs 46 and 48 update their BGP filters, access lists and other security features to redirect packets addressed to original site 20 instead to backup site 30 (step 130). ISPs 46 and 48 comply. Next, each of the BGP protocol functions 136 and 138 checks its configuration file to determine whether BGP protocol functions 136 and 138 are configured to automatically generate the notification to all ISPs (not just ISPs 16, 18, 46 and 48) and all routers that are directly connected and connected by BGP peering to edge routers 36 and 38 to route packets addressed to original site 20 instead to backup site 30 (decision 140).

Semiautomatic Announcements

If the BGP protocol functions 136 and 138 are not configured to automatically generate the notifications (decision 140, no branch), then each of the BGP protocol functions 136 and 138 sets a flag (description or other) to indicate an intent for manual generation of the notification and waits for failure of the original site 20 (step 142). Upon subsequent failure of the original site 20 (step 147), an administrator will notice the failure and (a) set each of the BGP protocol functions 126 and 128 to stop announcing the IP address and ASN of the original site 20 to the ISPs 16 and 18 (step 150) and (b) set each of the BGP protocol functions 136 and 138 to generate a notification to ISPs 46 and 48 and any other ISPs and routers that are directly connected and BGP peering to routers 36 and 38, to redirect all packets addressed to original site 20 instead to backup site 30 (step 158). In response, each of the BGP protocol functions 136 and 138 generates and broadcasts the announcement (step 158).

Upon subsequent restoration of the original site 20 (step 159), the administrator (a) sets the BGP protocol functions 136 and 138 to stop announcing the IP address of the original site 20 (step 160) and (b) sets the BGP protocol functions 126 and 128 to start announcing the IP address of the original site 20 to the ISPs 16 and 18 and any other ISPs and routers that are directly connected or connected by BGP peering to edge routers 26 and 28 (step 162). In response, new packets addressed to the original site 20 are routed to ISPs 16 and 18 of the original site and then via edge routers 26 or 28 to original site 20 (step 164).

Automatic Announcements

Refer again to, decision 140, yes branch where the BGP protocol functions 126, 128, 136 and 138 are configured for automatic operation. In such a case, the administrator of the BGP protocol functions 136 and 138 determines if the backup site 30 has its own ASN (decision 170). (The administrator can obtain an ASN from the American Registry for Internet Numbers.) If not (decision 170, no branch), then the BGP protocol functions 136 and 138 do not perform the automatic notification of the redirect, and instead notify an administrator to perform the foregoing semiautomatic process of steps 150-160 and proceeds to step 172 to set the flag indicating semiautomatic notification (step 172). However, if the backup site 30 has or can obtain its own ASN (decision 170, yes branch), then each of the BGP protocol functions 126, 128, 136 and 138 automatically prepares the announcements of the redirect based on a setting in a configuration file within edge routers 26, 28, 36, and 38 (step 171), and sets a flag to indicate ready for automatic announcement of the redirect (step 173). By way of example, the BGP protocol functions 136 and 138 of the backup site can use AS_PATH prepends to make their announcements of the IF address of the original site 20 less preferred than the announcements by BGP protocol functions 126 and 128 of the original site 20 (step 174). The AS path length is the fifth item in the BGPv4 decision process. The AS_PATH prepend step comprises appending the backup site 30 ASN multiple times onto the AS_PATH. This lengthens the AS_PATH to reach the backup site 30. This way the original site 20 has no AS_PATH prepends (in an effort to have the shortest, and most preferred AS_PATH possible) while the backup site 30 has multiple AS_PATH prepends lengthening its AS path thus making it less desirable, or less preferred, by BGP. Therefore, under normal operating modes, BGP will select the original site 20 with the shortest AS path length until such time as the original site 20 fails and the backup site 30 becomes the more desirable, or preferred, route. Six AS_PATH prepends are currently recommended to make this effective.

Thus, each of the BGP protocol functions 136 and 138 makes their (less preferred) announcements to ISPs 46 and 48 of the IP address of the original site 20, that packets addressed to the original site 20 should be routed instead directly to the backup site 30 (step 174). Packets with the IP address of the original site 20 continue to route to the original site 20 until there is an outage of the original site 20. If and when the original site 20 fails, its edge routers 26 and 28 cease to announce to ISPs 16 and 18 and to all other routers that are directly connected and connected by BGP peering to edge routers 26 and 28, the IP address of the original site 20 (step 178). In response, the announcements by BGP protocol functions 136 and 138 to ISPs 46 and 48 and all other routers that are directly connected and connected by BGP peering to edge routers 36 and 38 (that packets addressed to the original site 20 should instead be routed directly to the backup site 30) become the primary/controlling announcement. Consequently, subsequent packets addressed to the IP address of original site 20 will route directly to backup site 30 (step 179). When the original site 20 is subsequently restored, the edge routers 26 and 28 once again announce to ISPs 16 and 18, and all other routers that are directly connected and connected by BGP peering to edge routers 26 and 28 the IP address of the original site 20 (step 180). In response, BGP protocol functions 146 and 148 will cease to accept and cease to insert into the routing table as preferred routes, the announcements from BGP protocol 136 and 138 the IP address of the original site 20 (step 182), and subsequent packets will route to ISPs 16 and 18 and then to the original site 20 via edge routers 26 and 28 (without passing through ISPs 46 and 48 or edge routers 36 and 38 (step 184).

BGP protocol functions 126 and 128 in functional form (for example, executable form) can be loaded into edge routers 26 and 28 from computer readable media 226 and 228 such as magnetic disk or tape, optical disk, DYD, semiconductor memory, etc. or downloaded from the Internet or wireless network via TCP/IP or other network adapter cards in edge routers 26 and 28.

BGP protocol functions 126 and 128 in functional form (for example, executable form) can be loaded into edge routers 26 and 28 from computer readable media 236 and 238 such as magnetic disk or tape, optical disk, DVD, semiconductor memory, etc. or downloaded from the Internet or wireless network via TCP/IP or other network adapter cards in edge routers 26 and 28.

Based on the foregoing, system, method and program product for redirecting packets to a backup site have been disclosed. However, numerous modifications and substitutions can be made without deviating from the scope of the present invention. For example; other means of making routes less or more preferred may be used by edge routers 36 and 38 including, but not limited to, community string exchange and action upon the community string; BGP filter masks (/24) may change length in the future without change to the idea presented above. Therefore, the present invention has been disclosed by way of illustration and not limitation, and reference should be made to the following claims to determine the scope of the present invention.

What is claimed:

1. A method for routing to a first site, packets whose destination IP address is an IP address at a second site, after a failure at the second site, the first site comprising a first server, a first edge router for a first network comprising the first site, and a first Internet Service Provider (ISP) coupling the first edge router to an Internet, the second site comprising a second server, a second edge router for a second, different network comprising the second site, and a second ISP coupling the second edge router to the Internet, the first network having a unique first Autonomous System Number (ASN), the second network having a unique second ASN, said method comprising the steps of:

before the failure has occurred, the first edge router configuring an announcement stating that the packets whose destination IP address is the IP address at the second site are now to be routed to the IP address at the second site via a first route disposed in the first network having the first ASN;

before the failure has occurred, the second edge router periodically announcing to the second ISP a second route to the IP address at the second site, the second route being disposed in the second network having the second ASN;

in response to the failure having occurred, the second edge router ceasing the periodically announcing and the first edge router using the announcement to announce to the first ISP that the first site will receive the packets whose destination IP address is the IP address at the second site via the first route in the first network having the first ASN.

2. The method of claim 1, wherein the first route does not pass through the second ISP.

3. The method of claim 1, further comprising the step of:
before the failure has occurred, a CPU at the first ISP announcing to the second ISP that IP addresses to be rerouted to the IP address at the second site via the first route must have at least a specified minimum size.

4. The method of claim 1, further comprising the steps of:
before the failure has occurred, a CPU at the second ISP announcing periodically to the second ISP the second route to the IP address at the second site; and
in response to the failure having occurred, the CPU at the second ISP ceasing the announcing periodically.

5. The method of claim 1, further comprising the step of:
in response to the failure having occurred, a CPU at the second ISP announcing to the first ISP via the Internet that the second route no longer exists.

6. The method of claim 1, further comprising the step of:
in response to the failure having occurred, the first edge router announcing to the first ISP changes to source addresses that should be routed through the first ISP.

7. The method of claim 1, further comprising the step of:
before the failure has occurred, the first edge router not announcing to the first ISP the IP address at the second site.

8. A system for routing to a first site, packets whose destination IP address is an IP address at a second site after a failure at the second site, the system comprising:
the first site comprising a first server, a first edge router for a first network comprising the first server, and a first Internet Service Provider (ISP) coupling the first edge router to an Internet, wherein the first network has a unique first Autonomous System Number (ASN); and
the second site comprising a second server, a second edge router for a second, different network comprising the second server, and a second ISP coupling the second edge router to the Internet, wherein the second network has a unique second ASN, and wherein
the first edge router includes first program instructions to configure, before the failure occurs, an announcement stating that the packets whose destination IP address is the IP address at the second site are now to be routed to the IP address at the second site via a first route disposed in the first network having the first ASN;
the second edge router includes second program instructions to periodically announce to the second ISP, before the failure occurs, a second route to the IP address at the second site, the second route being disposed in the second network having the second ASN;
the second edge router includes third program instructions to cease, in response to the failure having occurred, to periodically announce the second route to the IP address at the second site;
the first edge router includes fourth program instructions to use the announcement to announce to the first ISP, in response to the failure having occurred, that the first site will receive the packets whose destination IP address is the IP address at the second site via the first route in the first network having the first ASN;
the first edge router includes a first CPU, a first computer readable memory, and first computer readable storage media to store the first and fourth program instructions for execution by the first CPU via the first computer readable memory;
the second edge router includes a second CPU, a second computer readable memory, and second computer readable storage media to store the second and third program instructions for execution by the second CPU via the second computer readable memory.

9. The system of claim 8, wherein the first route does not pass through the second ISP.

10. The system of claim 8,
wherein the first ISP includes fifth program instructions to announce to the second ISP, before the failure occurs, that IP addresses to be rerouted to the IP address at the second site via a first route must have at least a specified minimum size, and
wherein the first ISP includes a third CPU, a third computer readable memory, and third computer readable storage media to store the fifth program instructions for execution by the third CPU via the third computer readable memory.

11. The system of claim 8,
wherein the second ISP includes fifth program instructions:
to announce periodically to the second ISP, before the failure has occurred, the second route to the IP address at the second site, and
to cease to announce periodically to the second ISP, in response to the failure having occurred, the second route to the IP address at the second site, and
wherein the second ISP includes a third CPU, a third computer readable memory, and third computer readable storage media to store the fifth program instructions for execution by the third CPU via the third computer readable memory.

12. The system of claim 8,
wherein the second ISP includes fifth program instructions to announce to the first ISP via the Internet, in response to the failure having occurred, that the second route no longer exists,
wherein the second ISP includes a third CPU, a third computer readable memory, and third computer readable storage media to store the fifth program instructions for execution by the third CPU via the third computer readable memory.

13. The system of claim 8,
wherein the first edge router includes fifth program instructions to announce to the first ISP, in response to the failure having occurred, changes to source addresses that should be routed through the first ISP, and wherein the first computer readable storage media stores the fifth program instructions for execution by the first CPU via the first computer readable memory.

14. The system of claim 8, wherein the first edge router does not include program instructions to announce to the first ISP, before the failure has occurred, the IP address at the second site.

* * * * *